US012793959B2

(12) United States Patent
Seo et al.

(10) Patent No.: US 12,793,959 B2
(45) Date of Patent: Nov. 10, 2026

(54) SLOT DIE FOR MANUFACTURING RECHARGEABLE BATTERY ELECTRODE, RECHARGEABLE BATTERY ELECTRODE, AND MANUFACTURING METHOD USING THE SAME

(71) Applicant: SAMSUNG SDI CO., LTD., Yongin-si (KR)

(72) Inventors: Wonsub Seo, Yongin-si (KR); Raejoon Jung, Yongin-si (KR); Seunghak Lee, Yongin-si (KR); Sohun Kim, Yongin-si (KR); Gisung Kim, Yongin-si (KR); Jin Seo Park, Yongin-si (KR); Young-Hak Pyo, Yongin-si (KR)

(73) Assignee: SAMSUNG SDI CO., LTD., Yongin-Si (KR)

( * ) Notice: Subject to any disclaimer, the term of this patent is extended or adjusted under 35 U.S.C. 154(b) by 113 days.

(21) Appl. No.: 18/822,838

(22) Filed: Sep. 3, 2024

(65) Prior Publication Data

US 2025/0174624 A1 May 29, 2025

(30) Foreign Application Priority Data

Nov. 24, 2023 (KR) ........................ 10-2023-0166068

(51) Int. Cl.
*H01M 4/04* (2006.01)
*H01M 10/04* (2006.01)

(52) U.S. Cl.
CPC ..... *H01M 4/0433* (2013.01); *H01M 10/0404* (2013.01)

(58) Field of Classification Search
CPC ... B05C 5/0254; B05C 5/0258; B05C 5/0262; B05C 5/0266; B05C 5/0283
See application file for complete search history.

(56) References Cited

U.S. PATENT DOCUMENTS 3,756,195 A * 9/1973 Mercier .................... B05C 9/06 118/411
4,106,437 A 8/1978 Bartlett
(Continued)

FOREIGN PATENT DOCUMENTS

JP 2020-089871 A 6/2020
KR 10-2020-0011095 A 2/2020

OTHER PUBLICATIONS

May 12, 2025 Extended European Search Report in counterpart European Patent Application No. 24 20 9623.8.

*Primary Examiner* — Yung-Sheng M Tsui
*Assistant Examiner* — Melody Tsui
(74) *Attorney, Agent, or Firm* — Venable LLP

(57) ABSTRACT

A slot die for manufacturing a rechargeable battery electrode according to an embodiment includes a first block; a second block disposed on the first block; a third block disposed opposite to the second block; and a shim member that is disposed between the second block and the third block and forms a slot outlet in a width direction and a height direction. The first block forms a first cavity that receives an active material slurry supplied between the first block and the second block and forms a connection passage between the first block and the second block in a width direction and the height direction of the slot outlet. The second block forms a second cavity that receives the active material slurry supplied through the connection passage and discharges the received active material slurry through the slot outlet.

15 Claims, 10 Drawing Sheets

1

(56) References Cited

U.S. PATENT DOCUMENTS

| | | | | |
|---|---|---|---|---|
| 4,844,004 | A | 7/1989 | Hadzimihalis et al. | |
| 5,591,266 | A * | 1/1997 | Osawa | G11B 5/848 118/410 |
| 9,962,727 | B2 * | 5/2018 | Kim | B05C 5/0254 |
| 2010/0117254 | A1 | 5/2010 | Fork et al. | |
| 2012/0052191 | A1 * | 3/2012 | Fork | B05C 5/0212 427/75 |

* cited by examiner

SLOT DIE FOR MANUFACTURING RECHARGEABLE BATTERY ELECTRODE, RECHARGEABLE BATTERY ELECTRODE, AND MANUFACTURING METHOD USING THE SAME

CROSS-REFERENCE TO RELATED APPLICATION

This application claims priority to and the benefit of Korean Patent Application No. 10-2023-0166068 filed in the Korean Intellectual Property Office on Nov. 24, 2023, the entire contents of which are incorporated herein by reference.

BACKGROUND OF THE INVENTION

(a) Field of the Invention

The present disclosure relates to a slot die for manufacturing a rechargeable battery electrode, an electrode of a rechargeable battery, and a manufacturing method using the slot die. More particularly, the present disclosure relates to a slot die for manufacturing an electrode of a rechargeable battery, which minimizes a stagnation section of an active material slurry coated to a substrate, an electrode of a rechargeable battery, and a manufacturing method using the slot die.

(b) Description of the Related Art

Unlike a primary battery, a rechargeable battery repeatedly charges and discharges. Small-capacity rechargeable batteries are used in small and portable electronic devices such as mobile phones, laptop computers, and camcorders. Rechargeable batteries with large capacity and high density are used as power for driving motors of hybrid vehicles and electric vehicles or for energy storage.

A rechargeable battery includes an electrode assembly that charges and discharges a current, a case that accommodates the electrode assembly, an electrolyte solution, a cap plate that is coupled to an opening of the case, and an electrode terminal that connects the electrode assembly to outside of the cap plate.

The electrode assembly may be formed by disposing electrodes on both sides of a separator, which is an electrical insulating material, and winding the separator and electrode, laminating the separator and electrode, or a combination of laminating and winding the separator and the electrode. The separator isolates electrodes of different polarities within the electrode assembly and continuously maintains ion conductivity, enabling charge and discharge of the electrode assembly.

An electrode is formed by coating the active material slurry on a substrate. A slot die is used to manufacture electrodes by coating the active material slurry on the substrate. The slot die forms a cavity that supplies active material slurry, with the slot die including a lower block and an upper block that set a height of a slot outlet discharging the active material slurry, and a shim member installed between the lower block and the upper block to set a width of the slot.

In a coating process, various qualities such as a coating width, a loading level, and a start/end drag are managed. The loading level is calculated as the mass of an active material slurry per unit area (mg/cm$^2$) and is an important quality control item in the coating process.

SUMMARY OF THE INVENTION

An embodiment of the present disclosure provides a slot die for manufacturing a rechargeable battery electrode that reduces variance of a loading level in a width direction for the purpose of improving cell capacity of a new platform model. In addition, an embodiment of the present disclosure provides a slot die for manufacturing an electrode of a rechargeable battery that secures uniformity of flow speed of slurry discharged from the slot die in the width direction in order to reduce the variance of the loading level in the width direction.

In addition, an embodiment of the present disclosure provides an electrode of a rechargeable battery formed using a slot die for manufacturing the electrode of the rechargeable battery. Further, an embodiment of the present disclosure relates to a method for manufacturing an electrode of a rechargeable battery using the slot die for manufacturing the electrode of the rechargeable battery.

A slot die for manufacturing a rechargeable battery electrode according to an embodiment includes: a first block; a second block disposed on the first block; a third block disposed opposite to the second block; and a shim member that is disposed between the second block and the third block, the shim member forming a slot outlet that extends in a width direction and a height direction, wherein the first block forms a first cavity configured to receive an active material slurry supplied between the first block and the second block, and the first block forms a connection passage between the first block and the second block in the width direction and the height direction of the slot outlet, and the second block forms a second cavity that receives the active material slurry supplied through the connection passage and discharges the received active material slurry through the slot outlet.

The first cavity may extend in the width direction, and may include (i) a curved surface that forms a space for receiving the active material slurry and (ii) an inclined surface formed by one side of the curved surface and inclined upward toward the slot outlet, and the inclined surface may be connected to planar groove formed on an upper surface of the first block.

The planar groove may extend in a front and rear direction intersecting the width direction and in the width direction, and the planar groove may be connected to the inclined surface, and the connection passage may be set as a space between the first planar groove and a lower surface of the second block placed on the first planar groove.

The second cavity may penetrate the second block in a vertical direction and may be formed with a length corresponding to the first cavity in the width direction.

The inclined surface may be a first inclined surface and the second cavity may include a second inclined surface that is inclined upward toward the slot outlet, and the second inclined surface may be connected to the planar groove at the lower surface of the second block.

The connection passage may be a first connection passage and the second block may form a second connection passage between the second block and the third block, the second cavity may extend in the width direction, form a space for receiving the active material slurry, and include a second inclined surface formed by one side that is inclined upward toward the slot outlet, and the planar groove may be a first planar groove and the second inclined surface may be connected to a second planar groove formed on an upper surface of the second block.

The second planar groove may extend in the front and rear direction intersecting the width direction and in the width direction, and the second planar groove may be connected to the second inclined surface, the second connection passage may be set as a space between inner surfaces of both ends of the shim member, the second planar groove, and the lower surface of the second block placed on the second planar groove.

The slot outlet may be connected to the second connection passage, and the slot outlet may be set between the upper surface of the second block and a bottom surface of the third block in the height direction and between the inner surfaces of both ends of the shim member in the width direction.

A first cross-section of the first cavity in the vertical direction may be larger than a second cross-section of the second cavity in the vertical direction.

The second cavity forms an opening with a uniform size in the front and rear direction and extending along the width direction, and distances from the opening of the second cavity to the slot outlet are set uniformly in the width direction, The second cavity may penetrate the second block in the vertical direction and is formed to extend in the width direction with a length corresponding to a length of the first cavity in the width direction, and the second cavity may be formed by a concave inclined surface that is inclined upward toward the slot outlet.

The slot outlet may be connected to the concave inclined surface, and the slot outlet may be set by the upper surface of the second block in the front and rear direction and in the width direction, inner surfaces of both ends of the shim member, and a bottom surface of a third block disposed on the second cavity.

the second cavity may form an opening that is uniform in size in the width direction and in a front and rear direction, and a distance from the second cavity to the slot outlet is maximum in a middle of the second cavity in the width direction and minimum at both ends of the second cavity in the width direction.

The second cavity may form an opening the size of which changes in a front and rear direction that intersects the width direction, and a distance from the second cavity to the slot outlet may be maximum in a middle of the second cavity in the width direction and minimum at both ends of the second cavity in the width direction.

A length the opening formed by the second cavity may be minimum in the middle of the second cavity in the width direction and may be maximum at both ends of the second cavity in the width direction.

In addition, an electrode of a rechargeable battery according to an embodiment of the present disclosure may be manufactured using the slot die for manufacturing the rechargeable battery electrode.

The substrate in a wet state may have a maximum slurry loading level of 17.43 $mg/cm^2$ and a minimum slurry loading level of 17.16 $mg/cm^2$ in a width direction of the substrate.

In addition, a method for manufacturing an electrode of a rechargeable battery may include manufacturing the electrode by applying an active material slurry to a substrate using the slot die for manufacturing the rechargeable battery electrode.

The slot die according to the embodiment connects the first cavity and the second cavity in the height direction with the first connection passage to minimize the stagnation of slurry in the first and second cavities, and thus the loading level variance of the active material slurry with respect to the width direction of the slot outlet can be reduced. In addition, since the stagnation of the slurry in the first and second cavities can be minimized according to the embodiment, the uniformity of the flow speed of the slurry discharged to the slot outlet in the width direction can be secured, thereby reducing the loading level variance of the active material slurry in the width direction.

DETAILED DESCRIPTION OF THE EMBODIMENTS

Figure 1:
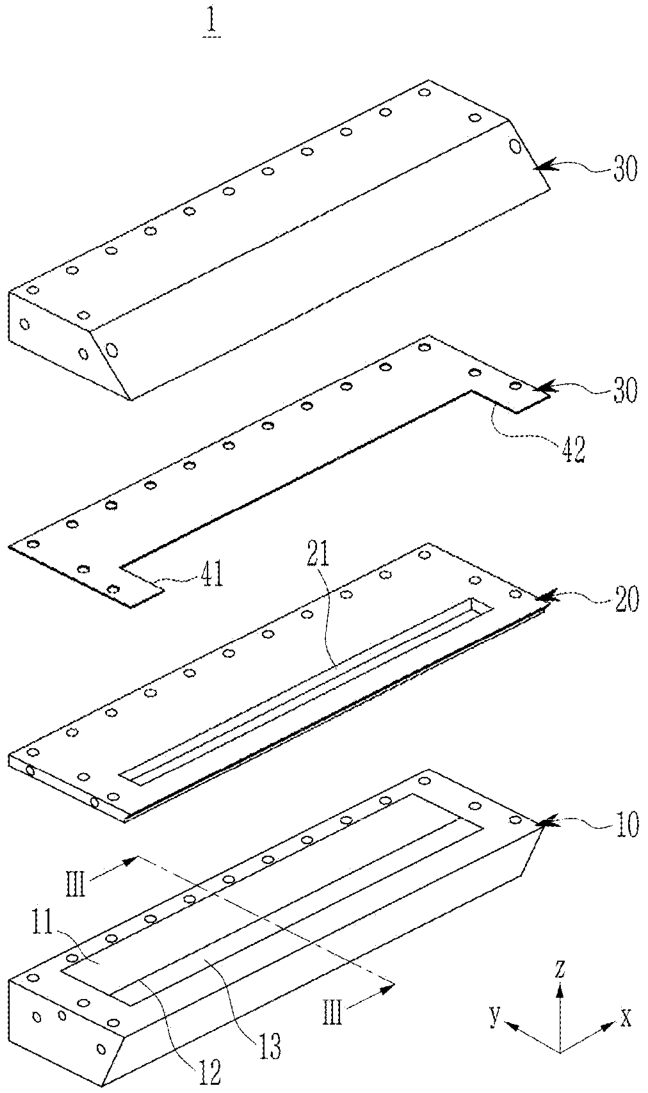
FIG. 1 is an exploded perspective view of a slot die for manufacturing a rechargeable battery electrode according to a first embodiment of the present disclosure.

Hereinafter, with reference to the accompanying drawing, various embodiments of the present disclosure will be described in detail such that a person of an ordinary skill can easily practice it in the technical field to which the present disclosure belongs. As those skilled in the art will realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
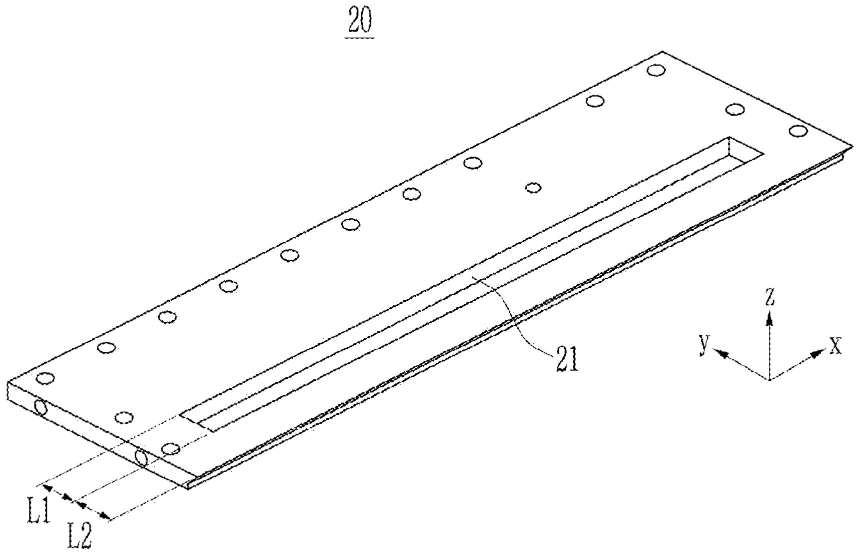
FIG. 2 is a top plan view of a middle block used in the slot die of FIG. 1.
Figure 3:
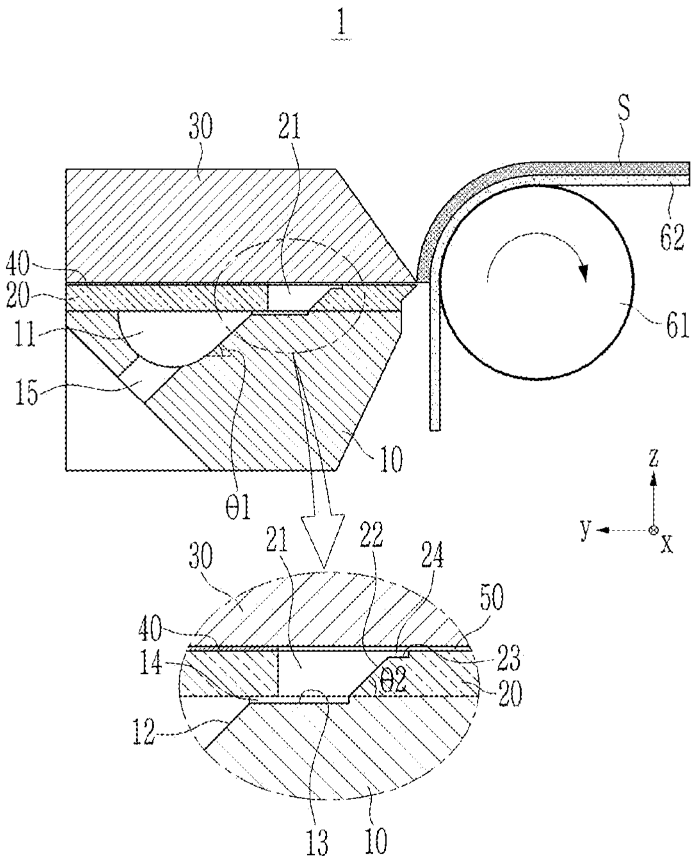
FIG. 3 is a cross-sectional view of FIG. 1, taken along the line III-III.

FIG. 1 is an exploded perspective view of a slot die for manufacturing a rechargeable battery electrode according to a first embodiment of the present disclosure, FIG. 2 is a top plan view of a middle block used in the slot die of FIG. 1, and FIG. 3 is a cross-sectional view of FIG. 1, taken along the line III-III.

Referring to FIG. 1 to FIG. 3, a slot die for manufacturing a rechargeable battery electrode (hereinafter, referred to as a slot die) according to a first embodiment includes a first block 10, a second block 20 on the first block 10, a third block disposed opposite to the second block 20, and a shim member 40 disposed between the second block 20 and the third block 30.

The shim member 40, installed between the second and third blocks 20 and 30, the first block 10, the second block 20, and the third block 30 may be fastened with a fastening member (not shown) to form the slot die 1. For reference, fastening holes through which fastening members pass are shown in the first, second, and third blocks 10, 20, and 30, and the shim member 40.

The shim member 40 is disposed between the second block 20 and the third block 30, forming a slot outlet 50 in the plane (x-z plane) of a width direction (x-axis direction) and a height direction (z-axis direction). The slot die 1 applies an active material slurry S, which is discharged through the slot outlet 50, to a substrate 62. The substrate progresses while being supported by a backup roll 61, while allowing the active material slurry S from being applied.

In the width direction (x-axis direction), the width means a width of the substrate 62 coated with the slot die 1 and a width of the slot outlet 50 corresponding to this width. The width of the substrate 62 is orthogonal to the moving direction of the substrate 62.

A variance of a loading level in the width direction (x-axis direction) of the substrate 62 and the slot outlet 50 often needs to be minimized for the purpose of cell encapsulation of the rechargeable battery. That is, the variance of the loading level in the width direction (x-axis direction) of the substrate 62 and the slot outlet 50 often needs to be minimized for the purpose of cell capacity improvement of the rechargeable battery. In order to reduce the variance of the loading level in the width direction, uniformity of flow speed in the width direction of the active material slurry discharged from the slot die 1 is needed.

To this end, the slot die 1 of the first embodiment has a second cavity 21 in addition to the first cavity 11. In other words, the active material slurry passing through the first cavity 11 is discharged to the slot outlet 50 by way of the second cavity 21, which has difference in height (z-axis direction). Therefore, as the active material slurry progresses sequentially, the flow speed of the active material slurry is more uniform in the width direction (x-axis direction).

Even in the case where the first cavity 11 and the second cavity 21 are provided, stagnation sections of the active material slurry may be formed inside the first cavity 11 and the second cavity 21, and slurry precipitation may occur in the stagnation sections. The precipitated slurry changes the size and shape of the first cavity 11 and the second cavity 21, which may have a negative effect on the slurry flow speed. Therefore, the first embodiment has a structure that reduces precipitation of the active material slurry inside the first cavity 11 and the second cavity 21.

Specifically, the first block 10 is provided with the first cavity 11 formed to temporarily accommodate the supplied active material slurry. The first block 10 is provided with a supply port 15 at a bottom and is connected to a slurry pump (not shown) that supplies the active material slurry. Thus, the active material slurry is supplied through the supply port 15 to the first cavity 11.

The first cavity 11 has an inner surface along a semicircular curved line in the y-z cross-section to minimize or prevent precipitation of the active material slurry. The first cavity 11 is formed long in the width direction (x-axis direction), and further includes a first inclined surface 12 that is inclined upward at a first angle θ1 toward the slot outlet 50, with the first inclined surface 12 extending toward the second block 12 from one curved surface of the inner surface of the semicircular curved line. The semicircular curved line and the first inclined surface 12 that is continues from the curved line may further reduce precipitation of the active material slurry.

A first connection passage 14 is formed between the first block 10 and the second block 20. The first inclined surface 12 in the first cavity 11 is connected to a first planar groove 13 formed on an upper surface of the first block 10. The first planar groove 13 includes a flat surface on a concave inner surface.

The first planar groove 13 is formed in the front-to-back direction (y-axis direction) and the width direction intersecting the width direction (x-axis direction) and is connected to the first inclined surface 12 of the first cavity 11. Therefore, the first connection passage 14 is set as a space between the first planar groove 13 and a lower surface of the second block 20 placed on the first planar groove 13. In other words, the first connection passage 14 forms an open space with a cross-section in the width direction (x-axis direction) and height direction (z-axis direction) on the upper surface of the first block 10 such that the active material slurry can progress in the y-axis direction.

The second block 20 forms the second cavity 21 that receives the active material slurry supplied through the first connection passage 14 and discharges it to the slot outlet 50. That is, the second block 20 is placed on the first block 10 to establish the second cavity 21, and the first connection passage 14 is established between the first block 10 and the second block 20. Thus, the second cavity 21 is provided in a higher position (in the z-axis direction) than the first cavity 11.

The second cavity 21 is connected to a lower side through the first connection passage 14, and a lower side of the second cavity 21 is set by the first planar groove 13. Therefore, the active material slurry supplied from the first cavity 11 to the first connection passage 14 progresses from the bottom to the top through the first planar groove 13 and fills the second cavity 21. That is, in the height direction (z-axis direction) of the slot die 1, the first cavity 11 is disposed below the second cavity 21.

The second cavity 21 penetrates the second block 20 in the vertical direction and is formed to have a length corresponding to the first cavity 11 in the width direction (x-axis direction). Thus, the active material slurry supplied from the first cavity 11 may be supplied to the second cavity 21 through the first connection passage 14 throughout the width direction (x-axis direction).

The second cavity 21 has an inclined inner surface in the y-z cross-section to minimize and prevent precipitation of the active material slurry. The second cavity 21 is formed long in the width direction (x-axis direction), forms a space for receiving the active material slurry, and further includes a second inclined surface 22 that is inclined upward at a second angle θ2 toward the slot outlet 50 in a direction toward the third block 30. The second inclined surface 22 of the second cavity 21 serves to further minimize and prevent precipitation of the active material slurry of the second cavity 21.

In example embodiments, the second angle θ2 is the size as the first angle θ1 to prevent and minimize precipitation of the active material slurry on either side of the first cavity 11 and the second cavity 21.

A second connection passage 24 is formed between the second block and the third block 30. In the second cavity 21, the second inclined surface 22 is connected to a second planar groove 23 formed on the upper surface of the second block 20. The second planar groove 23 includes a flat surface on the concave inner surface. With respect to a plane in the x-y direction, the second cavity 21 forms a minimum area at a part connected to the first planar groove 13, and the area gradually increases going upward (z-direction) along the second inclined surface 22.

The second planar groove 23 is formed in the front-back direction (y-axis direction) and the width direction intersecting the width direction (x-axis direction) and is connected to the second inclined surface 22 of the second cavity 21. Therefore, the second connection passage 24 is set as a space between inner surfaces 41 and 42 of both ends of the shim member 40, the second planar groove 23, and the lower surface of the third block 30 disposed above the second planar groove 23. In other words, the second connection passage 24 forms an open space with a cross-section in the width direction (x-axis direction) and the height direction (z-axis direction) on the upper surface of the second block 20, thereby enabling the progress of the active material slurry in the y-axis direction.

On a plane (x-y plane) that extends in the width direction (x-axis direction) and the front/back direction (y-axis direction), the second cavity 21 forms an opening in the front and rear directions. The opening has the same size L1 and is set in the width direction (x-axis direction), and the distance L2 from the opening of the second cavity 21 to the slot outlet 50 is uniform in the width direction (y-axis direction).

The slot die 1 of the first embodiment is compared with a slot die that does not have at least one of the above-stated configurations of the first cavity 11 and the second cavity 21, the first and second inclined surfaces 12 and 22, and the first and second connection passages 14 and 24. Compared to the other slot die, the slot die 1 of the first embodiment causes the flow speed of the active material slurry discharged to the slot outlet 50 to be more uniformly across the entire width direction (x-axis direction).

In addition, the slot outlet 50 is connected to the second connection passage 24, and is set as an open area between the inner surfaces 41 and 42 of both ends of the shim member 40 in the width direction (x-axis direction) between the upper surface of the second block 20 and the lower surface of the third block 30 in the height direction (z-axis direction)

Further, in the cross-section (yz) of the front-back direction (y-axis direction) and up-down direction (z-axis direction) that intersect the width direction (x-axis direction), a cross-section of first cavity 11 is larger than a cross-section of the second cavity 21. Therefore, as the active material slurry moves from the first cavity 11 to the second cavity 21, precipitation can be prevented due to reduction in supply pressure.

In the first embodiment, the first cavity 11 and the second cavity 21 are connected through the first and second connection passages 14 and 24 such that stagnation of the slurry in the first cavity 11 and the second cavity 21 can be minimized. Therefore, according to the first embodiment, a loading level variance of the active material slurry in the width direction of the slot outlet 50 can be reduced and the cell capacity of the rechargeable battery can be improved.

Hereinafter, various embodiments of the present disclosure will be described. The same configurations as in the previously described embodiments will be omitted and different configurations will be described.

Figure 4:
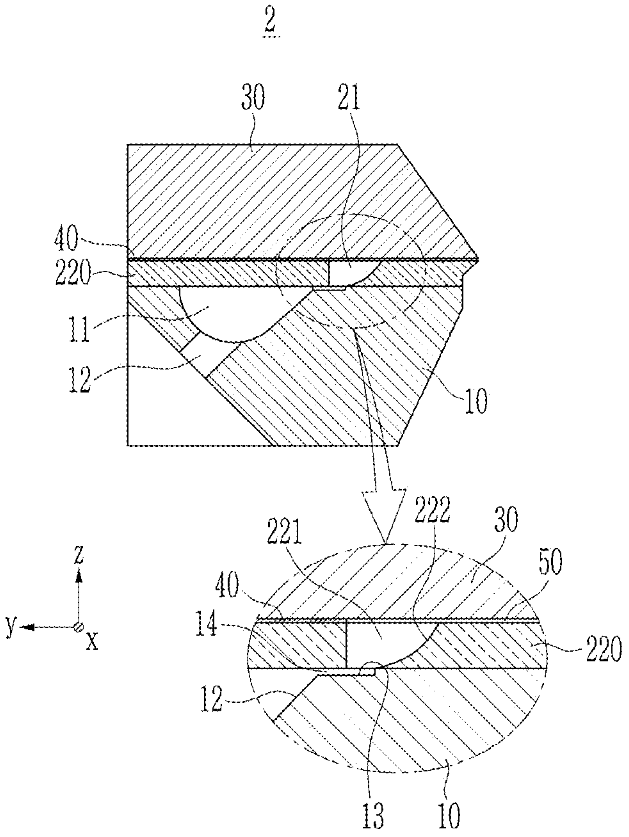
FIG. 4 is a cross-sectional view of a slot die for manufacturing a rechargeable battery electrode according to a second embodiment of the present disclosure.

FIG. 4 is a cross-sectional view of a slot die 2 for manufacturing a rechargeable battery electrode according to a second embodiment of the present disclosure. Referring to FIG. 4, in the slot die 2 according to the second embodiment, a second cavity 221 penetrates a second block 220 in upper and lower directions and is formed to be long in a width direction (x-axis direction) with a length corresponding to a first cavity 11. Therefore, an active material slurry supplied from the first cavity 11 may be simultaneously supplied to the second cavity 221 through a first connection passage 14 across the entire width direction (x-axis direction).

The second cavity 221 has an inclined inner surface in the y-z cross-section to minimize and prevent precipitation of the active material slurry. The second cavity 221 is formed long in the width direction (x-axis direction), forms a space for receiving the active material slurry. The second cavity 221 includes a concave inclined surface 222 that is inclined upward (z-axis direction) toward the slot outlet 50 and a third block 30. The concave inclined surface 222 is formed to be connected to the slot outlet 50. The concave inclined surface 222 of the second cavity 221 serves to further minimize and prevent precipitation of the active material slurry in the second cavity 221.

In addition, the slot outlet 50 is connected to the concave inclined surface 222, and is set by an upper surface of the second block 220 that in the front and rear direction (y-axis direction) extends in a width direction (x-axis direction), inner surfaces 41 and 42 of both ends of a shim member 40, and a bottom surface of a third block 30 that is disposed on the second cavity 221.

The concave inclined surface 222 of the second cavity 221 does not require a separate configuration corresponding to the second connection passage 24 of the first embodiment. An upper end of the concave inclined surface 222 functions as the second connection passage 24 of the first embodiment, thereby enabling the progress of active material slurry in the y-axis direction.

In the second embodiment, the first cavity 11 and the second cavity 221 are connected by the first connection passage 14 and the second cavity 221 is provided with the concave inclined surface 222, and therefore, stagnation of the slurry in the first cavity 11 and the second cavity 221 can be minimized. Therefore, according to the second embodiment, a loading level variance of the active material slurry in the width direction of the slot outlet 50 can be reduced and the cell capacity of the rechargeable battery can be improved.

Figure 5:
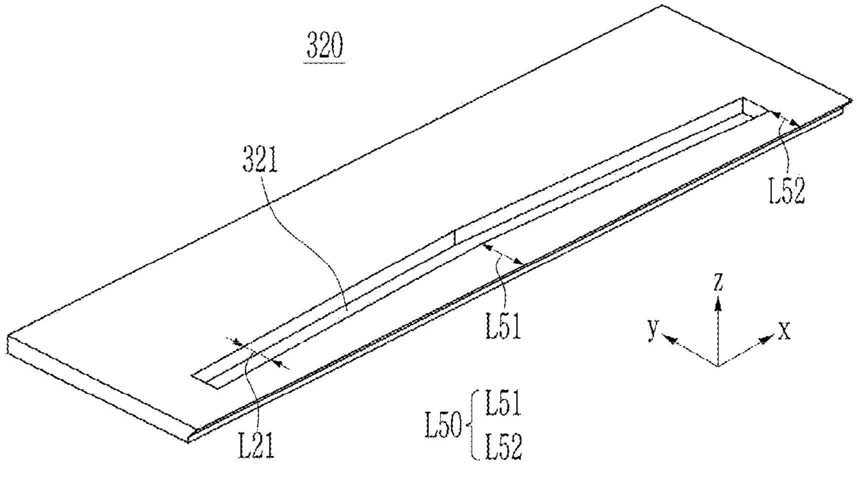
FIG. 5 is a perspective view of a middle block used in a slot die for manufacturing a rechargeable battery electrode according to a third embodiment of the present disclosure.

FIG. 5 is a perspective view of a middle block 320 used in a slot die for manufacturing a rechargeable battery electrode according to a third embodiment of the present disclosure. Referring to FIG. 3, in the middle block 320 used in a slot die according to the third embodiment, in a plane (x-y plane) that extends in a width direction (x-axis direction) and a front and rear direction (y-axis direction) intersecting the width direction, a second cavity 321 form an opening having the same size L21 in the front and rear directions, and a distance L50 from the second cavity 321 to a slot outlet 50 has the maximum distance L51 in the middle of the width direction (y-axis direction) and minimum distances L52 at both ends of the width direction.

The maximum distance L51 in the middle of the width direction of the slot outlet 50 may effectively respond to the faster flow speed of an active material slurry compared to other parts. That is, the flow speed of the active material slurry has the maximum flow speed at the maximum distance L51 of the slot outlet 50, and the minimum flow speed at the minimum distance L52. Such difference in distances L51 and L52 minimizes and prevents the difference in flow speed. Therefore, the maximum distance L51 and the minimum distance L52 of the second cavity 321 and a distance changed between the maximum distance L51 and the minimum distance L52 may further minimize and prevent precipitation in the active material slurry of the second cavity 321.

In addition, according to the third embodiment, stagnation of a slurry in the first and second cavities 11 and 321 can be minimized, thereby ensuring uniformity of the flow speed of the slurry in the width direction (x-axis direction) of discharged to the slot outlet 50 such that a loading level variance of the active material slurry can be reduced and the cell capacity of the rechargeable battery can be improved.

Figure 6:
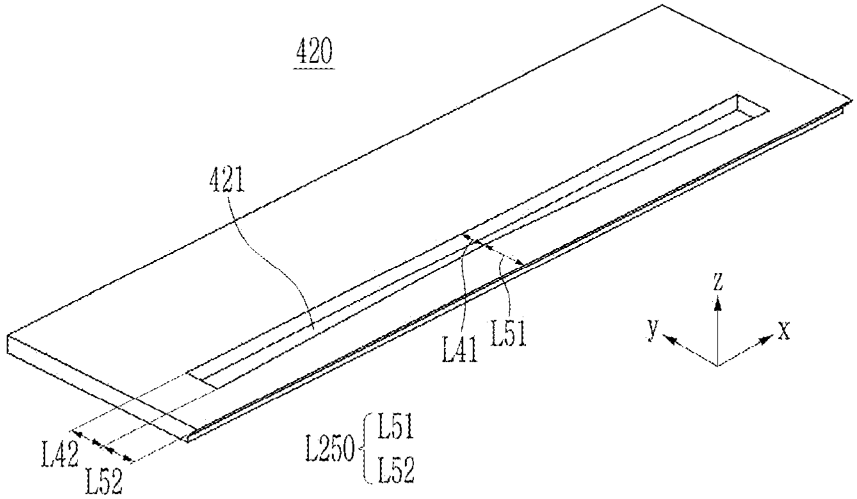
FIG. 6 is a perspective view of a middle block used in a slot die for manufacturing a rechargeable battery electrode according to a fourth embodiment of the present disclosure.

FIG. 6 is a perspective view of a middle block 420 used in a slot die for manufacturing a rechargeable battery electrode according to a fourth embodiment of the present disclosure. Referring to FIG. 6, in the middle block 420, on a plane (x-y plane) that extends in a width direction (x-axis direction) and a front and rear direction (y-axis direction) intersecting the width direction, a second cavity 421 forms an opening having a width that gradually changes along the width direction. As such, a distance L250 from the second cavity 421 to a slot outlet 50 has the maximum distance L51 in the middle of the width direction (y-axis direction) and minimum distances L52 at both ends of the width direction.

In addition, the plane of the second cavity 421 forms the opening in the front and rear directions with a minimum distance of L41 in a middle of the width direction and a maximum distance of L42 at both ends of the width direction. Therefore, the combination of the maximum distance L51 and the minimum distance L52 of the second cavity 321, distances that change between the maximum distance L51 and the minimum distance L52, and the minimum distance L41 and the maximum distance L42 of the openings of the second cavity 421 is used to further minimize the precipitation of the active material slurry of the second cavity 321.

In addition, according to the fourth embodiment, stagnation of the slurry in the first and second cavities 11 and 421 can be minimized, thereby ensuring uniformity of the flow speed of the slurry in the width direction (x-axis direction) of discharged to the slot outlet 50 such that a loading level variance of the active material slurry can be reduced and the cell capacity of the rechargeable battery can be improved.

Figure 7:
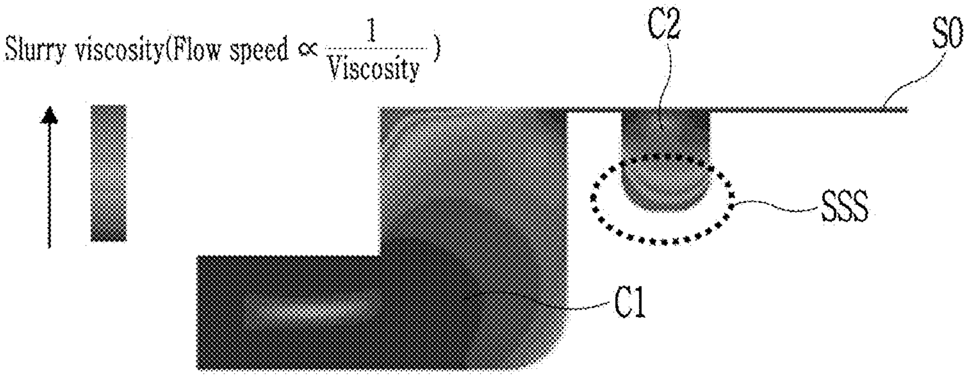
FIG. 7 is a diagram that shows a state of stagnation of a slurry in a slot die according to a conventional art.

FIG. 7 is a diagram that shows a state of stagnation of a slurry in a slot die according to conventional art. Referring to FIG. 7, in the slot die according to the conventional art, a slurry movement path remains horizontal from a first cavity C1 to a slot outlet 50 where the slurry is discharged. Therefore, the slurry flow speed is high only in an upper part of a second cavity C2, and the slurry flow speed is slow in a lower part, resulting in a slurry stagnation section SSS. In addition, slurry precipitation occurs in the slurry stagnation section at a bottom of the second cavity C2 over time. This increases a loading level variance of an active material slurry and reduces cell capacity of a rechargeable battery.

Figure 8:
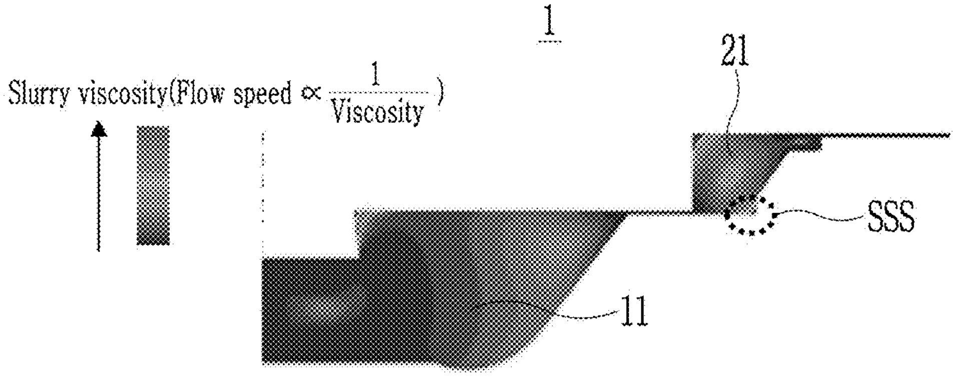
FIG. 8 is a diagram that shows a state of stagnation of a slurry in a slot die according to the first embodiment of the present disclosure.

FIG. 8 is a diagram that shows a state of stagnation of a slurry in a slot die according to the first embodiment of the present disclosure. Referring to FIG. 8, in the slot die 1 according to the first embodiment, the first cavity 11 is disposed below the second cavity 21. Therefore, since the slurry passes through second cavity 21 as a whole, the slurry stationary section SSS at the bottom of the second cavity 21 can be minimized. As a result, the slurry precipitation in the second cavity 21 is reduced, and a loading level similar to the initial stage can be maintained even during long-term production of the electrode of a battery.

Figure 9:
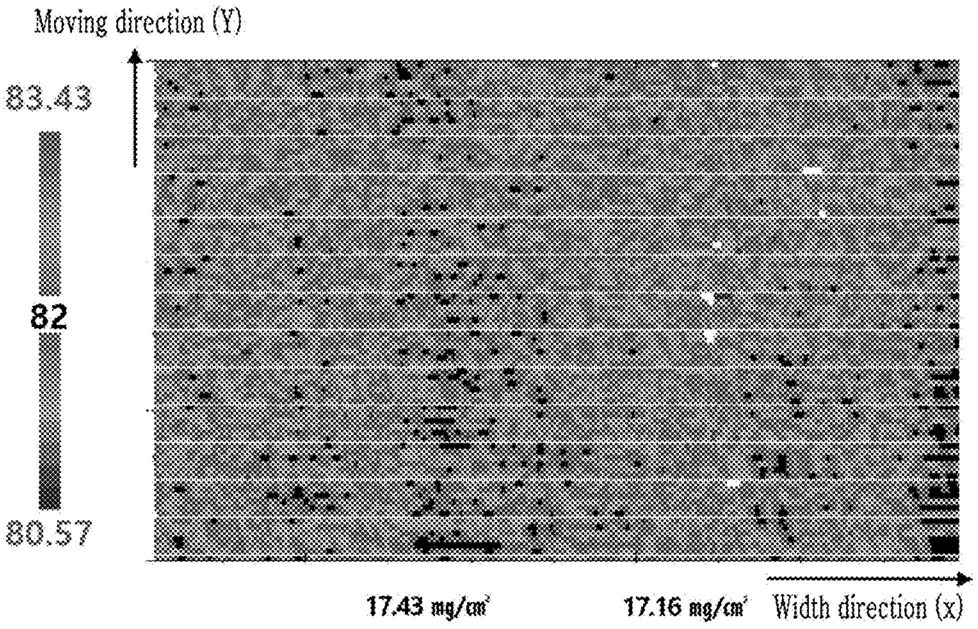
FIG. 9 is an image that shows uniformity of a loading level in a width direction of an electrode in the case of using the slot die according to the first embodiment of the present disclosure.
Figure 10:
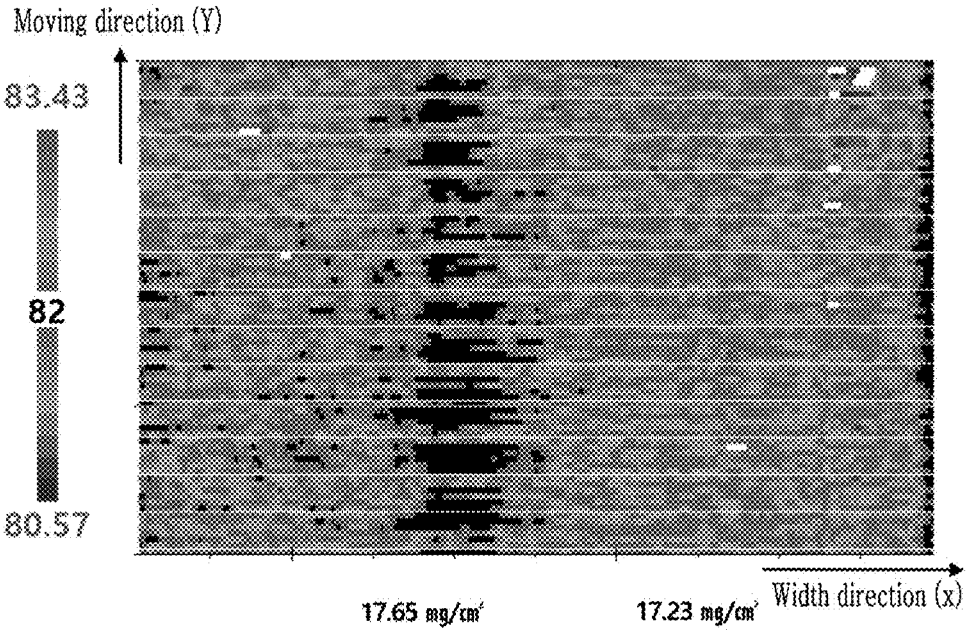
FIG. 10 is an image that shows uniformity of a loading level in a width direction of a substrate in an electrode in the case of using the slot die according to the conventional art.

FIG. 9 is an image that shows uniformity of a loading level in a width direction of an electrode in the case of using the slot die according to the first embodiment of the present disclosure, and FIG. 10 is an image that shows uniformity of a loading level in a width direction of a substrate in an electrode in the case of using the slot die according to the conventional art. Referring to FIGS. 9 and 10, the quality of a loading level for an electrode of a rechargeable battery manufactured with the slot die of the first embodiment and the quality of a loading level for an electrode of a rechargeable battery manufactured with the slot die having one cavity according to the conventional art can be compared.

In order to validate the comparison, the slot die of the first embodiment and the slot die conventional art were used in the same equipment, and the same active material slurry was supplied to each slot die through the same supply line and simultaneously coated on substrates. The results of the comparison show that the first embodiment tends to have superior uniformity of the load level in the width direction of the substrate compared to the conventional art.

In FIG. 9, in a wet state of the moving substrate in the width direction (x-axis direction) according to the first embodiment, a maximum loading level is 17.43 $mg/cm^2$ and a minimum loading level is 17.16 $mg/cm^2$. A difference between the maximum thickness and the minimum thickness, that is, the difference in loading level in the width direction, results in a rechargeable battery electrode with a loading level of 0.27 $mg/cm^2$.

In FIG. 10, in a wet state of the moving substrate in the width direction (x-axis direction) according to the conventional art, a maximum loading level is 17.65 $mg/cm^2$ and a minimum loading level is 17.23 $mg/cm^2$. A difference between the maximum thickness and the minimum thickness, that is, the difference in loading level in the width direction, results in a rechargeable battery electrode with a loading level of 0.42 $mg/cm^2$.

The difference in loading level of the electrode of the rechargeable battery of the first embodiment, which is 0.27 $mg/cm^2$, is less than the difference in loading level of the electrode of the rechargeable battery of the conventional art, which is 0.42 $mg/cm^2$. Accordingly, it can be seen that the first embodiment is superior to the conventional art in terms of uniformity of the loading level of the electrode of the rechargeable battery in the width direction.

In addition, a manufacturing method of the electrode of the rechargeable battery according to an embodiment can manufacture an electrode of a rechargeable battery by applying an active material slurry to a substrate using the slot die for manufacturing the rechargeable battery electrode.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the description of the present disclosure and the appended claims and drawings.

| <Description of symbols> |
| --- |
| 1, 2: slot die(slot die) |
| 10: first block |
| 11: first cavity |
| 12: first inclined surface |
| 13: first planar groove |
| 14: first connection passage |
| 15: supply hole |
| 20: second block |
| 21: second cavity |
| 22: second inclined surface |
| 23: second planar groove |

-continued

| <Description of symbols> |
|---|
| 24: second connection passage |
| 30: third block |
| 40: shim member |
| 41, 42: inner surface of both ends |
| 50: slot outlet |
| 61: backup roll |
| 62: substrate |
| 220: second block |
| 221: second cavity |
| 222: concave inclined surface |
| 320: middle block |
| 321: second cavity |
| 420: middle block |
| 421: second cavity |
| L1: size |
| L2: distance |
| L21: size |
| L41: minimum distance |
| L42: maximum distance |
| L50: distance |
| L51: maximum distance |
| L52: minimum distance |
| L250: distance |
| S: active material slurry |
| θ1: first angle |
| θ2: second angle |

What is claimed is:

1. A slot die for manufacturing a rechargeable battery electrode, the slot die comprising:

a first block;

a second block disposed on the first block;

a third block disposed opposite to the second block; and a shim member that is disposed between the second block and the third block, the shim member forming a slot outlet that extends in width direction and a height direction, wherein the first block forms a first cavity configured to receive an active material slurry supplied between the first block and the second block, and the first block forms a connection passage between the first block and the second block in the width direction and the height direction of the slot outlet, wherein the second block forms a second cavity that receives the active material slurry supplied through the connection passage and discharges the received active material slurry through the slot outlet, wherein the first cavity extends in the width direction, and the first cavity includes (i) a curved surface that forms a space for receiving the active material slurry and (ii) an inclined surface formed by one side of the curved surface and inclined upward toward the slot outlet, and wherein the inclined surface is connected to a planar groove formed on an upper surface of the first block.

2. The slot die for manufacturing the rechargeable battery electrode of claim 1, wherein the planar groove extends in a front and rear direction intersecting the width direction and in the width direction, and the planar groove is connected to the inclined surface, and wherein the connection passage is set as a space between the planar groove and a lower surface of the second block placed on the planar groove.

3. The slot die for manufacturing the rechargeable battery electrode of claim 2, wherein the second cavity penetrates the second block in a vertical direction and is formed with a length corresponding to the first cavity in the width direction.

4. The slot die for manufacturing the rechargeable battery electrode of claim 3, wherein the inclined surface is a first inclined surface and the second cavity includes a second inclined surface that is inclined upward toward the slot outlet, and wherein the second inclined surface is connected to the planar groove at the lower surface of the second block.

5. The slot die for manufacturing the rechargeable battery electrode of claim 4, wherein the connection passage is a first connection passage and the second block forms a second connection passage between the second block and the third block, wherein the second cavity extends in the width direction, forms a space for receiving the active material slurry, and includes the second inclined surface formed by one side that is inclined upward toward the slot outlet, and wherein the planar groove is a first planar groove and the second inclined surface is connected to a second planar groove formed on an upper surface of the second block.

6. The slot die for manufacturing the rechargeable battery electrode of claim 5, wherein the second planar groove extends in the front and rear direction intersecting the width direction and in the width direction, and the second planar groove is connected to the second inclined surface, wherein the second connection passage is set as a space between inner surfaces of both ends of the shim member, the second planar groove, and the lower surface of the second block placed on the second planar groove.

7. The slot die for manufacturing the rechargeable battery electrode of claim 6, wherein the slot outlet is connected to the second connection passage, and the slot outlet is set between the upper surface of the second block and a bottom surface of the third block in the height direction and between the inner surfaces of both ends of the shim member in the width direction.

8. The slot die for manufacturing the rechargeable battery electrode of claim 1, wherein a first cross-section of the first cavity in the vertical direction is larger than a second cross-section of the second cavity in the vertical direction.

9. The slot die for manufacturing the rechargeable battery electrode of claim 1, wherein the second cavity forms an opening with a uniform size in the front and rear direction and extending along the width direction, and wherein distances from the opening of the second cavity to the slot outlet are uniform in the width direction.

10. The slot die for manufacturing the rechargeable battery electrode of claim 2, wherein the second cavity penetrates the second block in the vertical direction and is formed to extend in the width direction with a length corresponding to a length of the first cavity in the width direction, and wherein the second cavity is formed by a concave inclined surface that is inclined upward toward the slot outlet.

11. The slot die for manufacturing the rechargeable battery electrode of claim 10, wherein the slot outlet is connected to the concave inclined surface, and wherein the slot outlet is set by the upper surface of the second block in the front and rear direction and in the width direction, inner surfaces of both ends of the shim member, and a bottom surface of a third block disposed on the second cavity.

12. The slot die for manufacturing the rechargeable battery electrode of claim 1, wherein the second cavity form an opening that is uniform in size in the width direction and in a front and rear direction, and wherein a distance from the second cavity to the slot outlet is maximum in a middle of the second cavity in the width direction and minimum at both ends of the second cavity in the width direction.

13. The slot die for manufacturing the rechargeable battery electrode of claim 1, wherein the second cavity form an opening the size of which changes in a front and rear direction that intersects the width direction, and wherein a distance from the second cavity to the slot outlet is maximum in a middle of the second cavity in the width direction and minimum at both ends of the second cavity in the width direction.

14. The slot die for manufacturing the rechargeable battery electrode of claim 12, wherein a length of the opening formed by the second cavity is minimum in the middle of the second cavity in the width direction and is maximum at both ends of the second cavity in the width direction.

15. A method for manufacturing an electrode of a rechargeable battery comprising manufacturing the electrode by applying an active material slurry to a substrate using the slot die for manufacturing the rechargeable battery electrode according to claim 1.

* * * * *